C. L. GREEN.
TRACTOR DRIVE.
APPLICATION FILED AUG. 21, 1918.
1,314,077.
Patented Aug. 26, 1919.
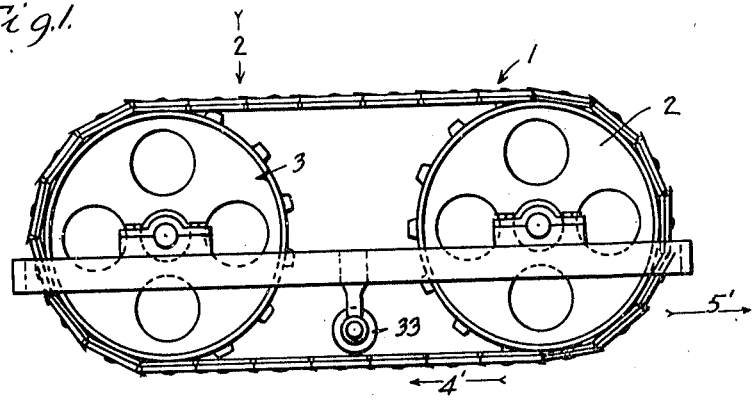
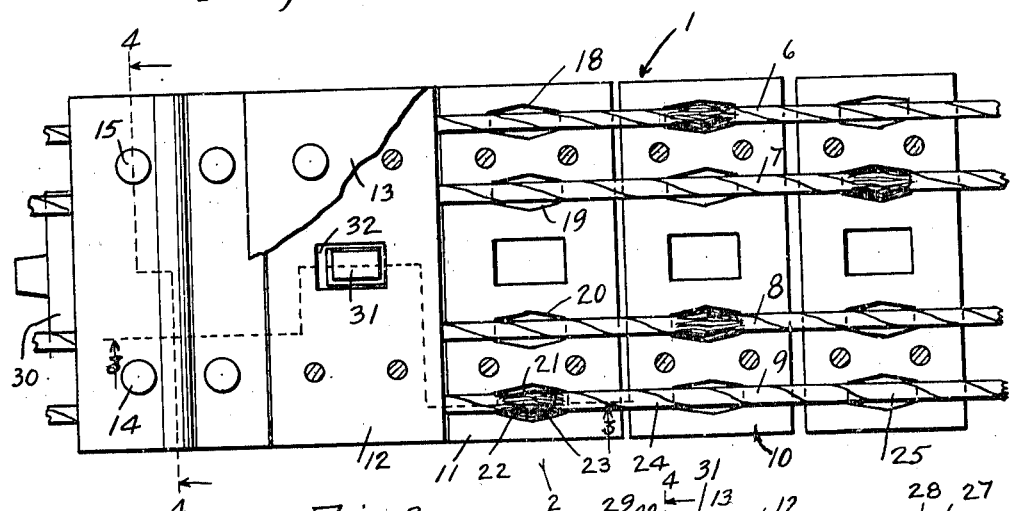
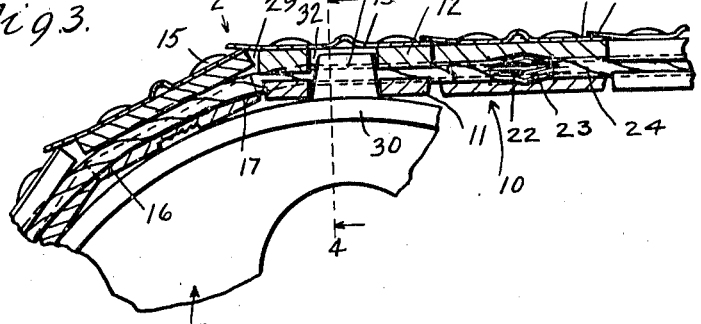
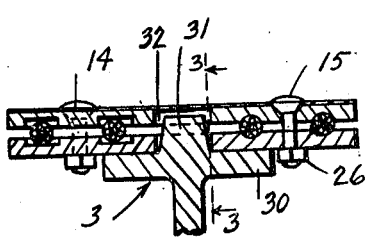
INVENTOR.
Charles L. Green.
BY
Hazard & Miller
ATTORNEYS.

UNITED STATES PATENT OFFICE.

CHARLES L. GREEN, OF SAN BERNARDINO, CALIFORNIA.

TRACTOR-DRIVE.

1,314,077.  Specification of Letters Patent.  Patented Aug. 26, 1919.

Application filed August 21, 1918. Serial No. 250,789.

*To all whom it may concern:*

Be it known that I, CHARLES L. GREEN, a citizen of the United States, residing at San Bernardino, in the county of San Bernardino and State of California, have invented new and useful Improvements in Tractor-Drives, of which the following is a specification.

My invention relates to tractor drives, and consists of the novel features herein shown, described and claimed.

Figure 1 is a side elevation of a tractor drive embodying the principles of my invention.

Fig. 2 is a fragmentary plan of the traction tread belt as seen in the direction indicated by the arrow 2 in Figs. 1 and 3, parts being broken away and shown in section.

Fig. 3 is a fragmentary vertical longitudinal sectional detail on the lines 3—3 of Figs. 2 and 4.

Fig. 4 is a cross sectional detail on the lines 4—4 of Figs. 2 and 3.

Referring to Fig. 1 the traction tread belt 1 is mounted upon a driving sprocket 2 and and idler sprocket 3, and is intended to be driven in the direction indicated by the arrow 4' when the vehicle is moving in the direction indicated by the arrow 5'. In other words, the driving sprocket 2 is in front of the idler sprocket 3 when the vehicle is moving forward.

Referring to Figs. 2, 3 and 4 the details of the traction tread belt 1 are as follows: The cables 6, 7, 8 and 9 form the cords of the belt. The bearing plates 10 are mounted upon the cables 6, 7, 8 and 9 edge to edge all the way around. Each bearing plate 10 comprises an inner section 11, an outer section 12, a casing 13, and bolts 14 and 15. The sections 11 and 12 are transversely grooved to receive the cables 6, 7, 8 and 9, and the grooves in the sections 11 have rounded ends 16 and 17, so that the cables may bend around the sprockets. The grooves in the sections 11 and 12 have central double tapered enlargements 18, 19, 20 and 21, so that the ends of the cables may meet in these enlargements for splicing or coupling, and when it is desired to couple a cable, the ends 22 and 23 are frayed and placed in an enlargement as 21, and then the frayed ends are soldered. If a cable breaks and it is desired to put in a new piece, such as 24, then a second joint 25 is made in another enlargement. The cables are made up to the desired length, the plate sections 11 and 12 applied, and the casings 13 applied, then the bolts 14 and 15 are inserted through the casings 13, through the sections 12 and 11, and nuts 26 are applied to the inner ends of the bolts and the nuts are screwed down tight, so as to clamp the plates firmly upon the cables. The casings 13 are sheet metal and the rear ends 27 of the casings overlap the forward ends 28 of the next following casings, so that the overlapping ends cover the cracks 29 between the plates. The sections 11 are narrower than the sections 12, so that the belt may bend as when passing around a sprocket.

The sprockets 2 and 3 have rims 30 fitting between the lines of bolts 14 and 15 against the inner faces of the sections 11 and the teeth 31 extending from the centers of the rims 30 through openings 32 in the sections 11 and 12; the casings 13 covering said openings 32. The openings 32 are centrally located in the plates. The sections 12 of the plates abut together when the belt is in a straight line, and when the belt is being driven, as in Fig. 1, there is a pushing strain upon the lower portion of the belt which is in contact with the ground, and the pulling strain upon the parts is more or less relieved by this pushing action.

In the traction tread belt drives heretofore in use, the belt is driven by the rear sprocket, and all the strain upon the belt is a pulling strain upon that portion of the belt which is in contact with the ground, whereas in my tractor drive, the belt is driven by the front sprocket, and there is no pulling strain upon the portion of the belt in contact with the ground. The belt may be held level upon the ground in any suitable way as by the roller 33.

The meeting edges of the inner sections 11 are beveled to fit each other when the belt is passing around a sprocket, so that when the edges of the outer sections are straight apart the edges of the inner sections will meet to push the belt.

Various changes may be made without departing from the spirit of my invention as claimed.

I claim:

1. In a tractor drive, a traction tread belt comprising a plurality of endless cables; bearing plates mounted upon the cables edge to edge; each bearing plate comprising an inner section; an outer section wider than the inner section; there being grooves in the meeting faces of the sections to receive the cables; bolts inserted through the inner and outer sections for clamping the sections together upon the cables; and there being sprocket openings through the centers of the bearing plates.

2. In a tractor drive, a traction tread belt comprising a plurality of endless cables; bearing plates fixed upon the cables edge to edge; each bearing plate comprising an inner section; an outer section wider than the inner section; there being grooves in the meeting faces of the outer and inner sections to receive the cables; the grooves in the inner sections having rounded ends; casings against the outer faces of the outer sections; the rear end of one casing overlapping the front end of the following casing; and bolts inserted through the casings and through the sections to clamp the sections upon the cables.

In testimony whereof I have signed my name to this specification.

CHARLES L. GREEN.